US009047323B2

(12) United States Patent
Ducharme et al.

(10) Patent No.: US 9,047,323 B2
(45) Date of Patent: Jun. 2, 2015

(54) SYSTEM AND METHOD FOR REVIEWING ROLE DEFINITIONS

(75) Inventors: James Ducharme, Somersworth, NH (US); Dan Uwe Zehme, Medfield, MA (US); Michael Sean Miller, Waterloo (CA); Deepak Taneja, Wayland, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/323,004

(22) Filed: Dec. 12, 2011

(65) Prior Publication Data
US 2013/0031066 A1 Jan. 31, 2013

Related U.S. Application Data

(60) Provisional application No. 61/512,222, filed on Jul. 27, 2011.

(51) Int. Cl.
G06F 17/30 (2006.01)
(52) U.S. Cl.
CPC .............................. G06F 17/30289 (2013.01)
(58) Field of Classification Search
CPC .................................................. G06F 17/30289

USPC ......................................................... 707/694
See application file for complete search history.

(56) References Cited

U.S. PATENT DOCUMENTS

| 5,564,016 | A * | 10/1996 | Korenshtein ....................... 726/3 |
| 5,774,650 | A * | 6/1998 | Chapman et al. .................. 726/7 |
| 5,864,871 | A * | 1/1999 | Kitain et al. ............ 707/999.009 |
| 6,055,637 | A * | 4/2000 | Hudson et al. .................... 726/20 |
| 7,739,303 | B2 * | 6/2010 | Martin et al. ................. 707/783 |
| 7,877,781 | B2 * | 1/2011 | Lim ................................... 726/1 |
| 2002/0165727 | A1 | 11/2002 | Greene et al. |
| 2004/0003132 | A1 | 1/2004 | Stanley et al. |
| 2005/0071740 | A1 | 3/2005 | Chee et al. |
| 2008/0034402 | A1 * | 2/2008 | Botz et al. .......................... 726/1 |
| 2008/0052102 | A1 * | 2/2008 | Taneja et al. ...................... 705/1 |

* cited by examiner

*Primary Examiner* — Huawen Peng
(74) *Attorney, Agent, or Firm* — BainwoodHuang

(57) ABSTRACT

A system for reviewing the ownership of data resources includes a database that stores a plurality of data resource identifiers. Each of the plurality of data resource identifiers has an associated owner field. The system also includes a second database that stores data resource review definitions. The review definitions define a review processes for the plurality of data resources. The system further includes a processor that is in communication with the data resource database and the review definition database. The processor executes the data resource ownership review processes defined by the review definitions at the appropriate times.

48 Claims, 13 Drawing Sheets

Create New Review Definition

Review Type

☐ User Access Review
xxxxxxxx xxx xxxxxxx xx xxxxxxx xxx xxxxx xx xxxxx xx xxx xxxx
xxx xxxxxxxxx xxx xx xxxxx xxxx ☐ Role Definition Review
xxxx xx x xxxx xxxx xxx x xx xxxx xxxx xxxxx x xx xxxxxxxxx xxx xxxxx xx xx
xxxxxxxxxx xxx xxx xx xxxxxxxxx xx xxx xxxxxx xxx xxx xxxxxxxxxxx xxxxx xxxxxxxxxx xx x xxxxxx xx x xxxxxx
xxxxxx xx x xxxx xx xxxx xxxxxxxxx xxxx xx xxxxx ☐ Group Definition Review
xxxxxxxx xxx xxxxxxx xx xxxxxxx xxx xxxxx xx xxxxx xx xxx xxxx
xxx xxxxxxxxxx xxx xx xxxxx xxxx ☐ Account Access and Ownership Review
xxxxxxxxxx xxx xxx xx xxxxxxxxx xxx xx xxxx xxxxxx xxx xxx xxxxxx xxxxx xxxx xxxxxxxxxx xxx xxxxxxxxx xxxx xxxxxxxxx xx x xxxxxx xx x xxxxxx
xxx xx xxx xxxxx
xxxxxxx xx x xxxx xx xxxx xxxxxxxxx xxxx xx xxxxx ☐ Data Resource Access Review
xxxx xx xxxx xxxx xxx x xx xxxx xxxxx xxxxx xxx x xx xxxxxxxxx xxx xxxxx xxxx xx xx
xxx xx xxxx xxxx ☑ Data Resource Ownership Review
xxxx xx xxxx xxxx xxx x xx xxxx xxxxx xxxxx xxx x xx xxxxxxxxxx xxx xxxxx xxxx xx xx
310

◀ Back | Next ▶ | Finish | Cancel | Help

Create New Review Definition

Xxxxxx Xxxxxxxx

Review Def. Name: [Patient Example] — 405
Item Type to Review: [Data Resource Ownership] — 401
Description: [_____] — 410
Control URL: [_____] — 415
Control Description: [_____] — 420
Review Instructions: [_____] — 425
Owner: Xxxxxxxxxx — 430
Duration of Reviews: [Xxxxxx] — 435
Default Review State: [On Hold] [Active] — 450
Schedule — 455

Xxxxxx ☒ Xxx ☐ Xx
Xxx ☐ Xxxx ☐ Xxxx ☐ xxxx/xxxx/xxxx 🗓
Xxxxxx ☐ Xxx ☐ Xxxxxx ☐ Xxxxxx ☐ Xxxxxx ☐ Xxxxxxxxxx ☐ Xxxxxx ☐ Xxx ◀ Back | Next ▲ | Finish | Cancel | Help

Create New Review Definition

Xxxx Xxxxxxxx Xxxxxxx
xxxxxx x xxxx xxxx xxxxxxx
☐ All Data Res. —505
☐ Select Data Res. —510
☒ Data Resources that Satisfy Particular Conditions —515
   ☒ Data Res. in a Defined —520
      State
   ☐ That have Particular Attributes —525
   ☐ That are Part of Particular —530
      Resource Set
   ☐ That are Part of Particular Resource Sets having —535
      Particular Attributes
xxxxxx x xxxx xxxx xxxxxxx
☐ Xxx x xxx xx xxx xxxxxxx xxxxx

[Back] [Next ▶] [Finish] [Cancel] [Help]

FIG. 5

Create New Review Definition

Xxxx Xxxxxxxx Xxxxxxxxx
xxxxxxxxxxxxxx
☐ Identified Owner to Perform Review —— 610
☒ Suggested Data Resource Option —— 620
  ☐ All Listed Owners —— 625
  ☐ Limit Number —— 630
☐ Business Owners of Data Res. Sets —— 635
☐ Technical Owners of Data Res. Sets —— 640
☐ Select Explicit List of Reviewers —— 645
xxxxxx x xxxx xxxx xxxxxxx
☐ Enable Sign-Off —— 670
xxxxxxxxxxxxxxx
xxxxxx x xxxx xxxx xxxxxxx
☐ Coverage File —— 650
xxxxxx x xxxx xxxx xxxxxxx
☐ Alternate Managers File —— 655

◀ Back | Next ▲ | Finish | Cancel | Help

SYSTEM AND METHOD FOR REVIEWING ROLE DEFINITIONS

CROSS-REFERENCE TO RELATED APPLICATIONS

This application claims priority to U.S. provisional application Ser. No. 61/512,222 entitled, "System and Method for Reviewing Data Resources and Ownership", filed on Jul. 27, 2011, the entire contents of which are hereby incorporated by reference.

STATEMENT REGARDING FEDERALLY SPONSORED RESEARCH OR DEVELOPMENT

Not applicable.

REFERENCE TO A SEQUENCE LISTING, A TABLE, OR COMPUTER PROGRAM LISTING COMPACT DISC APPENDIX

Not applicable.

BACKGROUND OF THE INVENTION

The invention relates generally to access governance systems that grant access and entitlements to users, and more specifically to a system and method for reviewing data resources and the accuracy of the owners assigned to data resources.

In general, access governance systems define a user's access rights and entitlements to available resources. For example, a user may have read/write access to a source control system, the ability to work on issues in a defect tracking system, and read/write access to the engineering folder on the corporate file share. Typical systems have numerous data resources to which users may have access. These data resources may be grouped into sets that are business-oriented for management purposes. For example, data resources for engineering, finance, human resources and other departments may be grouped into sets that are aligned around their relationship to the groups that utilize the resources in an organization.

There are known systems for reviewing a user's access rights in a system. However, these systems only review the data resources from the point of view of which users have access to the data resources. These systems do not have the ability to review the attributes of the data resources or the owners assigned to the data resources. What is desired then is a system that is able to review the attributes, including ownership, of the resources managed by an access governance system.

SUMMARY OF THE INVENTION

The invention relates generally to a system and method for reviewing the accuracy of the attributes of the data resources managed by an access governance system, including the ownership of the data resources. The method includes storing a plurality of data resource identifiers in a data resource database. Each of the plurality of data resource identifiers identifies a data resource managed by the system. Each of the plurality of data resource identifiers also has an associated owner field. In one embodiment, the identifier is a name of the data resource. The method also includes storing a plurality of review definitions in a review definition database. Each review definition defines a data resource review process for at least one of the plurality of data resources. To perform a data resource review, a processor executes a data resource review process defined by the review definition.

In one embodiment a system user creates the review definition. To create the review definition, the user selects which data resources are to be included in the review, the reviewers to perform the review, and the schedule for executing the review. In one embodiment, to create the review definition, the user may select from predetermined review options. The user may select a single reviewer or may select a plurality of reviewers among whom to distribute the review. In another embodiment, the user may select data resources by selecting data resource name, data resource state, data resource type, data resource set, data resource attribute, and data resource set attribute and data resource owner.

Once the review definition is created, the review may be executed. To execute the review, the processor notifies the selected reviewers of the pending review. In one embodiment, each time a data resource review is performed, an instance of the review is created. In various embodiments, the reviewers may select to maintain the data resource ownership, to change the ownership, or to indicate that the reviewer does not know the owner of the data resource.

An overall objective of the invention is to have a review system and process that can be used initially to assign and validate ownership of data resources managed by an access governance system and can be used regularly over time to ensure that (1) ownership assignments keep up with real changes in the organization, (2) owners are assigned to data resources are added to the system.

Another objective of the invention is to have a system that uses the same primary process for ensuring data resource ownership accuracy initially as it does to ensure the accuracy is maintained over time, that is by having the appropriate actors engage in a review of the owners assigned to data resources. Another objective of the invention is to have a data resource ownership review process that allows changes to be made to the owners of data resources where inaccuracies are found.

Yet another objective of the invention is to have a data resource review process that may be distributed throughout the organization. Different actors within an organization will have the specific knowledge required to ascertain the accuracy of different elements of various data resources, and the system according to the invention provides a way to identify these actors and bring their contributions into the process.

BRIEF DESCRIPTION OF THE DRAWINGS

The invention is pointed out with particularity in the appended claims. The above and further advantages of this invention may be better understood by referring to the following description taken in conjunction with the accompanying drawings, in which:

FIG. 3 is a pictorial view of a screenshot of one embodiment of the invention showing exemplary fields for creating different types of review definitions;

FIG. 4 is a pictorial view of a screenshot of one embodiment of the invention showing exemplary fields for creating a data resource review definition FIG. 5 is a pictorial view of a screenshot of one embodiment of the invention showing exemplary selections for defining which data resource(s) are included in the data resource review definition;

FIG. 6 is a pictorial view of a screenshot of one embodiment of the invention showing exemplary selections for the reviewers for a data resource review definition;

FIG. 7 is a pictorial view of a screenshot of one embodiment of the invention showing exemplary action fields for a data resource review definition;

The attached drawings are intended to better illustrate the present invention without limiting it in any manner whatsoever. Like reference characters in the respective drawn figures indicate corresponding parts or steps.

DETAILED DESCRIPTION OF THE INVENTION

Figure 1:
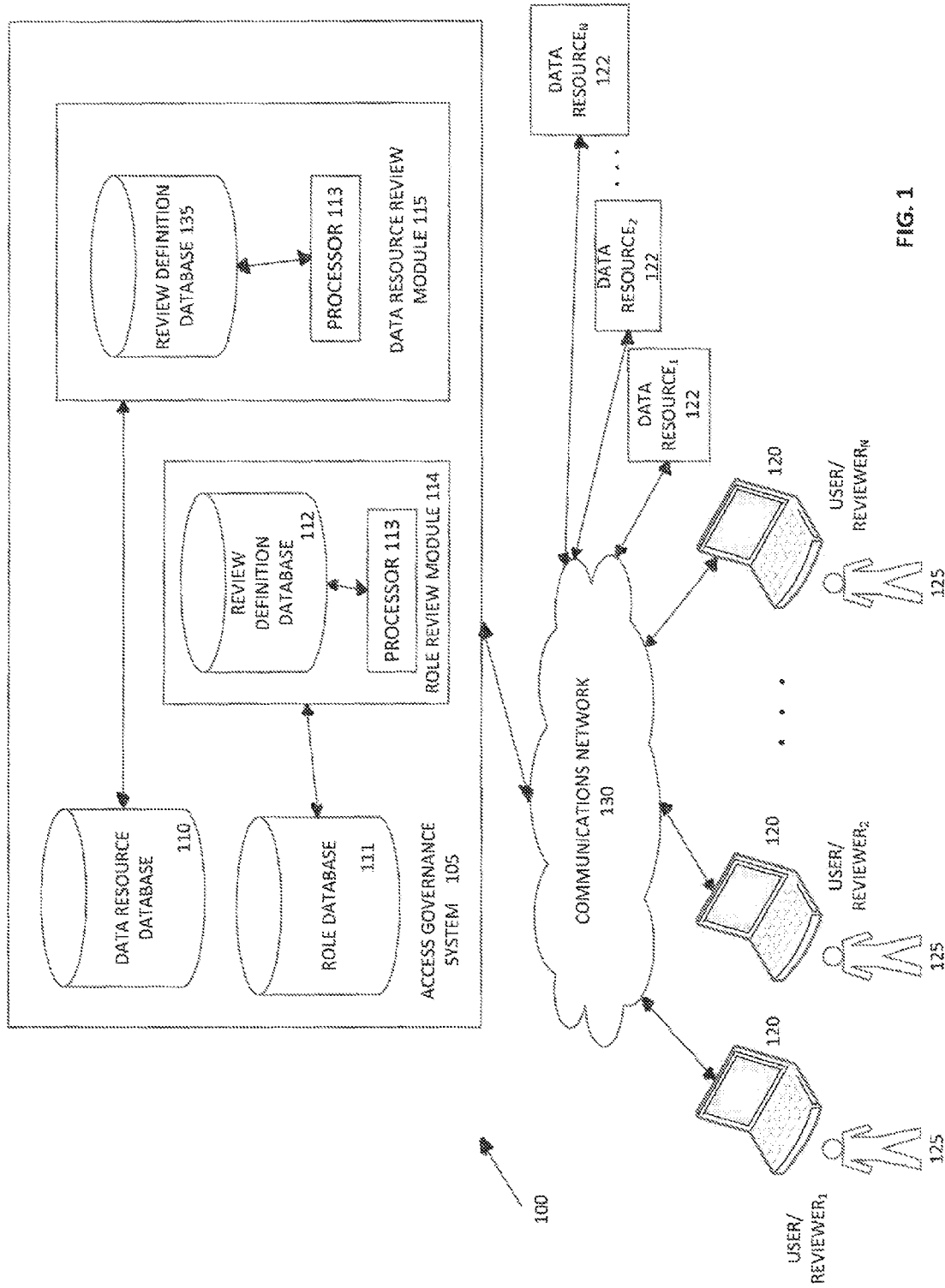
FIG. 1 is a block diagram of one embodiment of a system for reviewing data resource ownership.

Referring to FIG. 1 and in brief overview, an embodiment of a computer-implemented system 100 for reviewing data resources and ownership is shown. The system 100 includes an access governance system 105 which includes a data resource database 110, and a data resource review module 115. The access governance system may also include a role database 111 and a role review module 112. The system 100 further includes a plurality of user/reviewer computers$_{1-N}$ 120 that are capable of communicating with the access governance system 105 via a communications network 130. The system 100 also includes a plurality of data resources$_{1-N}$ 122 to be accessed. A user/reviewer computer 120 may be any computer or terminal to which a user/reviewer 125 has access. The reviewer computer 120 may be a single computer, a plurality of computers, or any electronic device through which the reviewer 125 may access the access governance system 105.

The communications network 130 is any communications network that is capable of electronically connecting the review computers 120 with the access governance system 105. For example, the communications network may be the Internet, an intranet, VPN, wireless network or any other type of network that is able to provide communications between computers/electronic devices. In another embodiment, the reviewer computers 120 may communicate with the access governance system through different types of communications networks.

The access governance system 105 specifies the access rights of each user to the data resources. In the embodiment shown, the access governance system 105 stores a plurality of data resources in the data resource database 110. The data resources may be any of the types of data resources described above in the Background of the Invention. The data resources represent data resource objects that users may wish to access. In one embodiment, the system 105 collects the identity of resource objects from the target data access system to be controlled by the access governance system 105, such as a file system. For example, file shares and folders are represented in the access governance system as data resources.

In one embodiment, each of the plurality of data resources is assigned a unique identifier. The identifier may be a name, number or any other method for uniquely identifying a data resource. The data resource database 110 stores the identifiers and the associated data resource(s). Repeating an example from the Background of the Invention section, an identifier may be the name "engineering" and the associated data resource may be the engineering folder on the corporate file share. The data resource database 110 also stores an associated owner for each of the data resources. The owner is the person responsible for the data resource. In one embodiment, the data resource database 110 has an owner field for storing the owner information for each data resource.

In another embodiment the data resources are represented by metadata which may include the following fields: Data Resource Name, Data Resource Path, Data Owner, State, State Changed Date, Reviewed Date, Classification, Classification Allow, Classification Deny, Server, Root Share, Data Resource Set and Custom Attributes. The Data Resource Name field is the name for the data resource to be displayed. The Data Resource Path field identifies the location of the data resource on the source system. The Data Resource Path and the Data Resource name uniquely identify a data resource on a particular system. The Data Owner field is the owner of the data resource. The State field represents the current state of the data resource. In one embodiment, the State field includes the following options: unverified, verified, "to be removed" and "do not manage". The unverified state is the default state when the data resource is collected by the system or created in the system by a user. The verified state indicates that the data resource was reviewed in a review. The "to be removed" state indicates that the data resource has been identified as "unused" by a reviewer and should be removed from the system. The "do not manage" state indicates that the data resource should not be managed by the system. The State Changed Date field indicates the date that the state of the data resource was last changed. The Reviewed Date field indicates the date that the data resource was last reviewed.

The Classification field identifies all the data classifications for the data resource. Classifications may include any arbitrary meta-data tags that user desires to associate with the data resource. For example, a classification may be used to identify that the data resource contains personally identifying information ("PII") or to identify that the data resource contains Sarbanes-Oxley ("SOX") regulation-related information. The Classification field may be used for other flags that typically provide additional meta-data about what the data resource contains. In one embodiment, this field does not have a set of enumerated or fixed values—they can be determined by the user. The Classification Allow field identifies the list of classifications that are allowed by the data resource. In one embodiment, a "none" entry signifies that all potential data classifications are allowed. The Classification Deny field identifies the list of data classifications that are prohibited by the data resource. In one embodiment, a "none" entry signifies that all potential data classifications are allowed.

The Server field identifies the host name of the component on which the data resource resides. The Root Share identifies the Windows share of the data resource.

The Data Resource Set field indicates the groupings to which the data resource belongs. The data resource sets are used to group the data resource objects in sets that are business-oriented for management purposes.

The data resource may also have custom attributes which are identified.

As will be described in more detail below, these metadata fields can be leveraged in performing reviews.

The data resource review module 115 includes a review definition database 135 and a processor 140. The review definition database 135 stores the review definitions which define the review processes for each of the plurality of data resources. The processor 140 executes the review processes at the appropriate times as will be discussed in more detail below. In another embodiment, the data resource database 110 and the review definition database 135 are the same database. In another embodiment, the processor 140 is not dedicated to the data resource review module 115, but may be any processor that is part of the access governance system 105.

Figure 2:
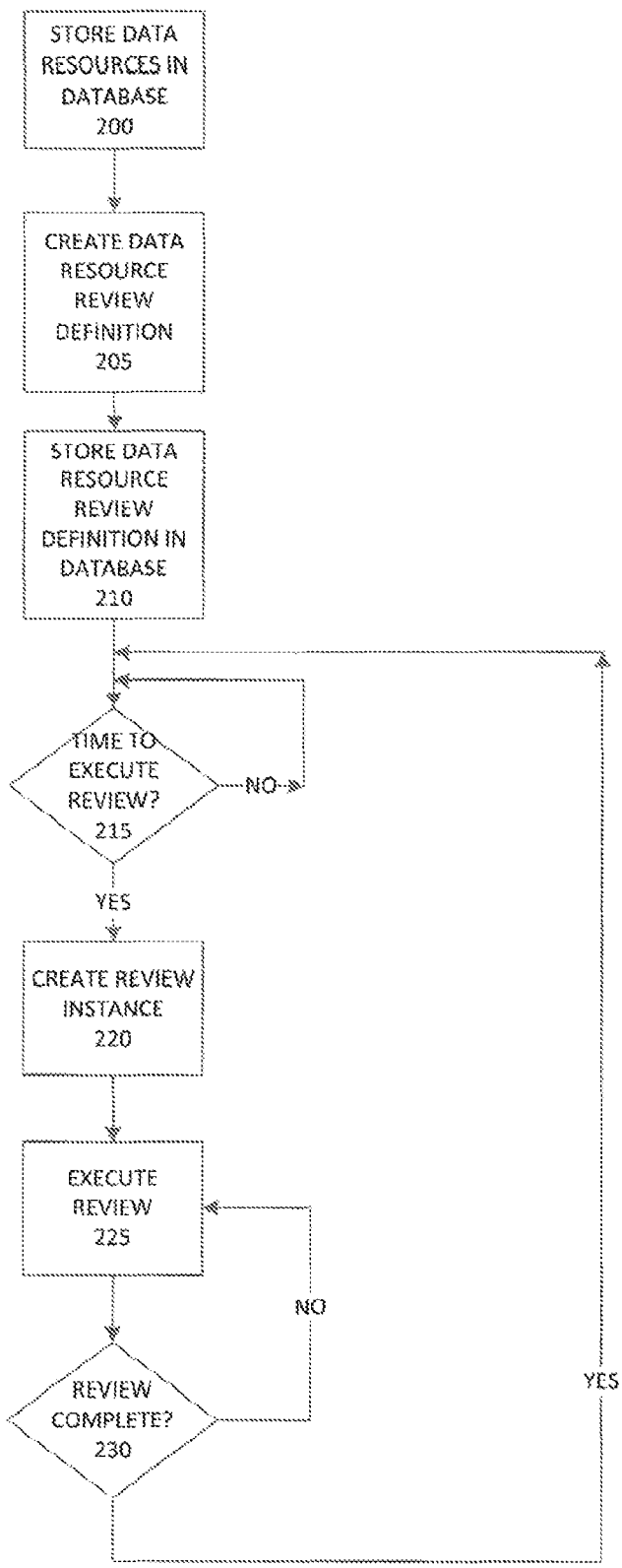
FIG. 2 is a flowchart representation of one embodiment of a process according to the invention for reviewing data resource ownership.

Referring now to FIG. 2 and in brief overview, an embodiment of a computer-implemented process for reviewing data resources and ownership is shown. In step 200, the access governance system 105 stores the data resources and associated owners in the data resource database 110. In step 205, a user creates a review definition and in step 210 the access governance system 105 stores the review definition in the review definition database 135. Next, in step 215, the data resource review module 115 determines whether it is time to execute the review of a data resource according to the review definition. If it is not time to execute the review, the data resource review module 115 repeats step 215 until it is time to execute the review of the data resource. To execute the review, the data resource review module 115 first creates an instance of the review in step 220. Next, in step 225, the data resource review module 115 executes the review. In step 230, the data resource review module 115 determines if the review is complete. If the review is not complete, the data resource review module 115 continues performing steps 225 and 230 until the review is complete. When the review is complete, the data resource review module returns to step 215 until the next time the review is to be performed.

Techniques for reviewing access rights of individual users to data resources, one user at a time, is well known in the art and will not be described in detail here. One of the primary focuses of the invention is defining a review process for data resources and using the review process to look at the data resources in a system to ensure they are valid resources. A second primary focus is to define a review process for data resources that ensures that the owner responsible for each data resource is identified and correct. This is different from reviewing access rights of individual users. An additional goal of the invention is to define and use a distributed review process to look at the data resources and associated owners.

Review Definition

After the data resources are stored in the data resource database 110, the first step in performing a review of those data resources according to the invention is to create review definitions (step 205 of FIG. 2). In this step, a user creates a review that determines what will be reviewed, by whom, on what schedule, with what level of detail, etc. In one embodiment of the invention, this is a configuration step with a large number of options, each of which will modify the behavior visible to the reviewers when the review is actually run. The creation of the review definition is a one-time process, although in some embodiments, the definition can be edited at any time if it is determined that some options should be changed. In one embodiment, a review definition can usually be simply explained in natural language. An example of a review definition may be: "a review process that involves having all engineering data resources in the "Engineering Resources" set to be reviewed by the associated owners, once per quarter". Another example is "a reviewer process that involves having all data resources not already marked as verified reviewed by their suggested owners, once per quarter."

To create a data resource review definition, the user first navigates to the appropriate screen to create the data resource review definition. As described above in the discussion of FIG. 1, in one embodiment, the data resource review module 115 is part of a larger access governance system 105. In one such embodiment, the process for creating the definition of a data resource review is the same as that for all the other review definition types available. For example, an access governance system may have the ability to perform the following types of reviews: user access review, role definition review, group definition review, account access and ownership review, data resource access review, and data resource definition and data resource definition and ownership review. In different embodiments, the appropriate screen may be selectable from a tab on the menu, from a drop down menu, from a set of options presented on a screen, or any other method known in the art for presenting selectable options in software. FIG. 3 shows a screenshot 300 of one embodiment of a software implementation for creating different types of review definitions. In this embodiment, a user chooses which type of review definition to create by selecting the name of the review definition type. In the example screenshot 300 shown, the user has selected "Data Resource Ownership Review" 310.

Referring now to FIG. 4, a screenshot 400 of one embodiment of a software implementation for creating a data resource review definition is shown. In an embodiment in which there are several review types, the "Item Type to Review" field 401 identifies that this review definition is for a data resource ownership review. In this screen, the user can fill in some metadata about this review definition. The user can enter a name or other identifier for the data resource review definition in the "Review Definition Name" field 405. In the "Description" field 410, the user may enter a brief description of the purpose of the review. The "Control URL" field 415 and the "Control Description" field 420 may be used to define any relationships of the data resource review definition to any formal controls. In the "Review Instructions" field 425, the user can define a block of instructions that will appear to the reviewers when they are performing the reviews. Every data resource review definition has an owner, which can be selected in the "Owner" field 430.

The screen 400 also includes a block of information about how instances of this data resource review are run. The "Duration of Reviews" field 435 defines how long the reviews run. In the example shown in FIG. 4, the user may specify the number of weeks for which the data resource review will run. In other embodiments, the user may select whether or not the data resource review is available for rule actions. In yet another embodiment, the user may select whether or not changes from the review are generated automatically. If the changes are not to be generated automatically, in one embodiment, the changes have to be explicitly executed by the definition owner. In the "Default Review State" field 450, the user may specify whether instances default to starting "on hold" or in the "active" state.

In one embodiment, the invention includes an option for enabling reviews to run on an automatic schedule. In "Schedule" field 455, the user can define a schedule for automatically running the review. In other embodiments, reviews can be run on demand by a user, automatically, or both automatically and on demand. If reviews are only to be run "on demand", then the user need not set a defined schedule in "Schedule" field 455.

Referring to FIG. 5, with the basic metadata defined, the next step is to identify which data resources are going to be reviewed. The user can select "all data resources" option 505, or can use several different schemes to identify a targeted subset of data resources. In the example shown in FIG. 5, the user has selected to review all data resources which meet particular criteria, specifically those that are in an unverified state. Other schemes may make more sense in other situations. For example, a user may select the particular data resources to review by choosing "Selected data resources" option 510. As described above, the user may select to review data resources that satisfy particular conditions 515, such as data resources that are in a defined state 520, data resources that have particular attributes 425, data resources that are part of a particular data resource set 530, or data resources that belong to data resource sets having particular attributes 535. Other options are available in other embodiments. In general, the options are designed to cover a wide range of possible business logic.

Now that that user has defined what the review is about and which data resources are being reviewed, in one embodiment, the user may have the option to define how the selected data resources will be reviewed.

The next step is to select the reviewers and which objects each reviewer is to review. FIG. 6 shows one example of screen 600 that presents options for selecting reviewers. There are several different ways to associate reviewers with reviews, and each data resource review definition can use one or more of the options. If the data resource(s) to be reviewed already have an identified owner(s), the user may select to have the identified owner(s) perform the review 610. However, often there is no owner associated with a data resource and the goal of the data resource ownership review is to correctly identify the owner. If no owner is identified, the use may not selection option 610. In this case, there is an option to assign a group of users previously identified in the system to be the reviewers. In this scenario, these users will be "suggested" users, that is, users that are potential owners of the data resource(s) being reviewed.

In one such embodiment, the user will select the suggested data resource option 620. Within this option 620, the user may select to make all the users in the suggested owners list a review in option 625 or may limit the number of suggested owners in option 630. In one embodiment, the user may select that a particular number of suggest owners who are most likely the owner of the data resource be selected. For example, the user may select to limit the suggested owners to the top 5 suggested owners as shown in field 630. As described above, data resources may be grouped into data resource sets in a business-oriented fashion. In cases having data resource sets, other options to select reviewers include business owners of the associated data resource sets 635 and technical owners of the associated data resource sets 640. In yet another embodiment, the user may simply select the explicit list of reviewers to perform the review using option 645. In still another embodiment having a defined field for types of users, the user may select users of a particular type to perform the review. In other embodiments, more advanced cases can be resolved with a coverage file 650 or alternate managers file 655. The user may also enable the reviewers to sign off using field 670 and may prevent reviewers from reviewing their own entitlements.

In one embodiment, in addition to defining reviewers, a data resource review definition allows the user to define monitors for the reviews. Monitors monitor the status of a review. Monitors may be defined using the same kinds of mappings that are used to define reviewers. For example, the following options may be used to grant "monitor" access to the review: selected users over the entire review, suggested data owners for their data resources (options include all suggested owners or a set number of most likely owners), data resource owners of the data resources being reviewed, business owners of the associated data resource sets, technical owners of the associated data resource sets, and coverage files that determine the monitors. As well as indicating who monitors the review, the user can indicate what type of access the monitor has. Access options include read, read/write and administrator. Similar to reviewers, monitors may be prevented from monitoring their own user entitlements.

The user may also select the display view to use for the review's summary windows. The options may include a default detail view of all data resources, or the display may be customized by the user.

Figure 7:
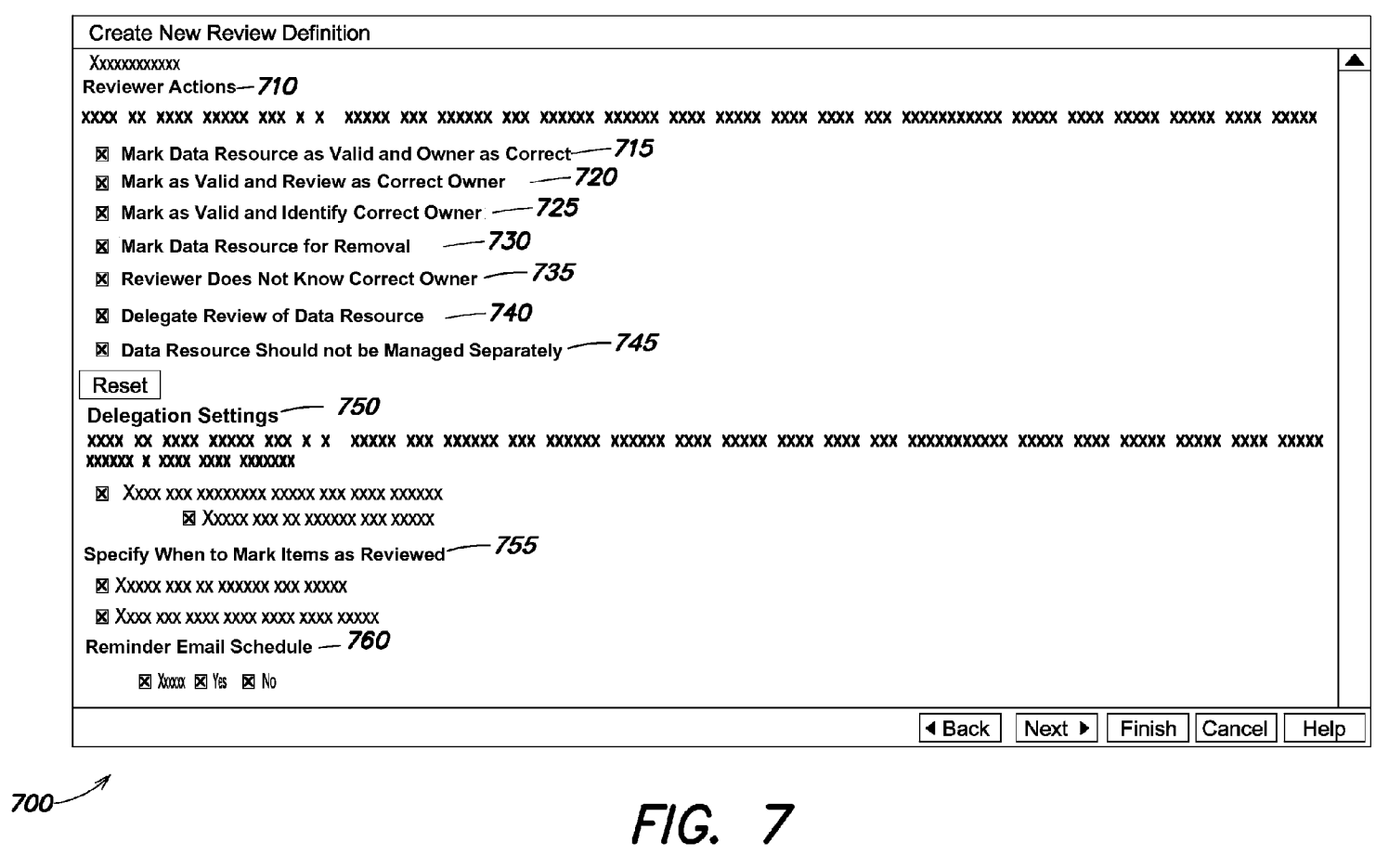

FIG. 7 presents additional configuration options to complete the data resource review definition. In the embodiment shown, the user may select the actions 710 that the reviewer may perform. In one embodiment, in addition to selecting what actions are available to reviewers, the user can customize the text displayed to the reviewers. If the reviewer believes that data resource and identified data resource are correct, the reviewer may select the option 715 to mark the data resource as a valid data resource and the identified owner as the correct owner. If the reviewer is the owner of the data resource, the reviewer may select the option 720 to mark the data resource as a valid data resource and confirms that the review is the correct owner 720. If the data resource is not identified or is incorrect, the reviewer may select the option 725 to mark the data resource as a valid data resource and identify the correct owner. If the reviewer believes the data resource is not correct, the reviewer may select the option 730 to mark the data resource for removal. If the reviewer does not know who the correct owner is, the review selects option 735. The reviewer may also select to delegate the review of the data resource 740 or indicate that a data resource should not be managed separately 745.

The "Delegation Settings" field 750 enables users to select whether or not reviewers and owner/monitors are allowed to delegate their responsibilities within a review. In field 755, the user may specify when to mark items as reviewed. For example, a user may select to mark items as reviewed when the items are signed off, or when the review as a whole is completed. Finally, using the "Reminder emails schedule" field 760, the user may specify whether or not reminder emails to be sent to reviewers and/or monitors are scheduled and at what frequency.

Figure 8:
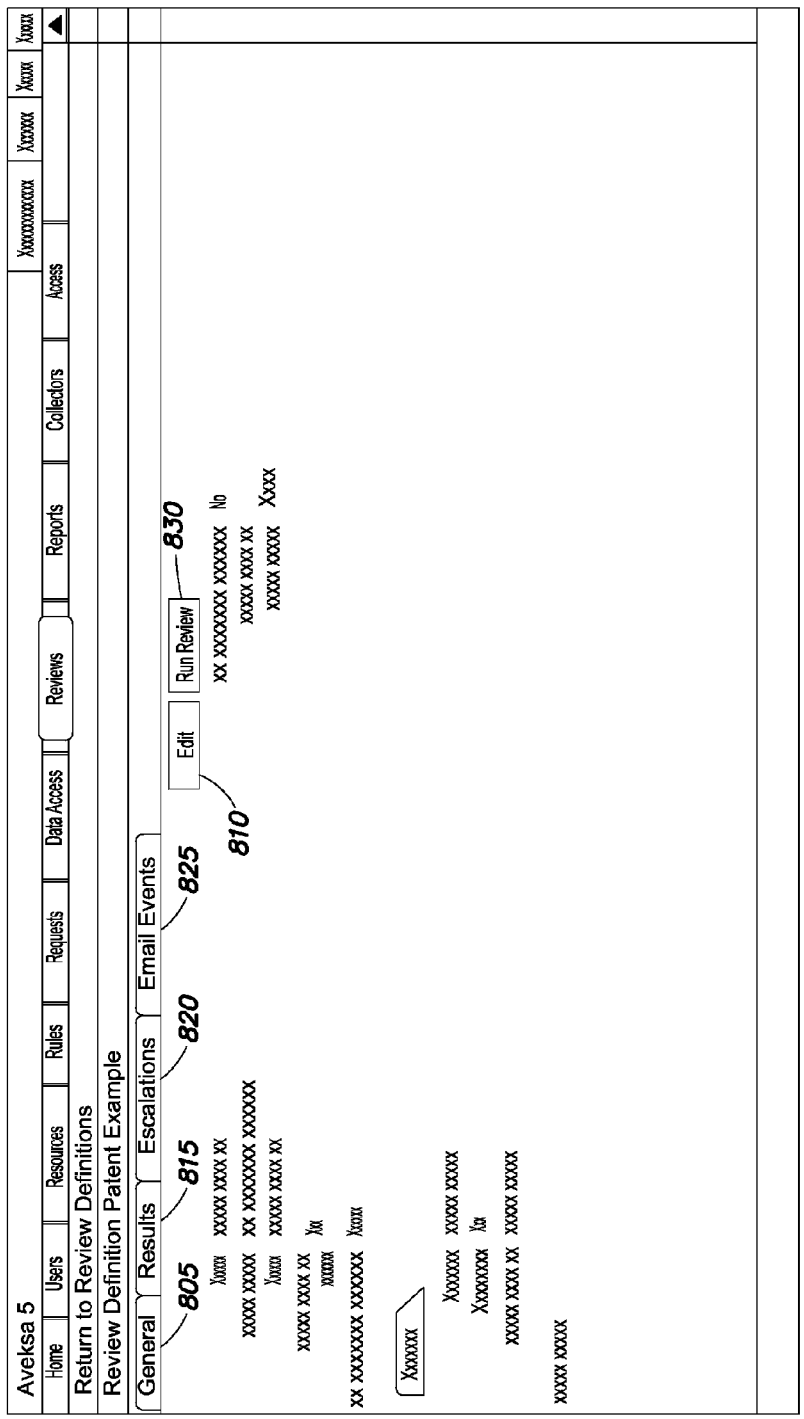
FIG. 8 is a pictorial view of a screenshot of one embodiment of the invention showing an example of a completed data resource review definition.

FIG. 8 shows an example of a completed data resource review definition. The screen 800 includes a General tab 805 with information about the definition, an Edit button 810 that allows a user to alter any of the settings the user just configured, and a series of other tabs. When selected, the Results tab 815 shows information about the different "runs" of this particular data resource review definition. The Escalations tab 820 shows any escalations arising from reviews based on this definition. The Email Events tab 825 tracks events generated from reviews based on this definition. Administrators may trigger explicit review instantiation for reviews not on a schedule, or for ad hoc additional review cycles, via the "Run Review" button 830.

Performing the Reviews

Once the data resource review definition has been created, the next step is to execute the review either automatically, on a schedule, or manually via explicit administrator action. The data resource review process defined by the previously created data resource review definition is thereby "run". Effectively, this involves creating an instance of the kind of review that the definition describes, and putting it into effect. A definition may have a large number of such instances associated with it over time—for example, a quarterly review of Engineering Data Resources described above will be run four times a year, since it is on a quarterly schedule. Each of these "runs" amounts to using the invention to track and complete a review according to a specific data resource review definition.

Managing Review Instances

In one embodiment, the data resource review module 115 stores each instance of a review that is performed. In one embodiment, the data resource review module 115 includes an option to display all review instances, their current state (Active/On Hold/Complete) and their completion status (such as percentage complete). Selecting a particular review instance (i.e. by clicking on a name) drills into that review run for additional details.

Figure 9:
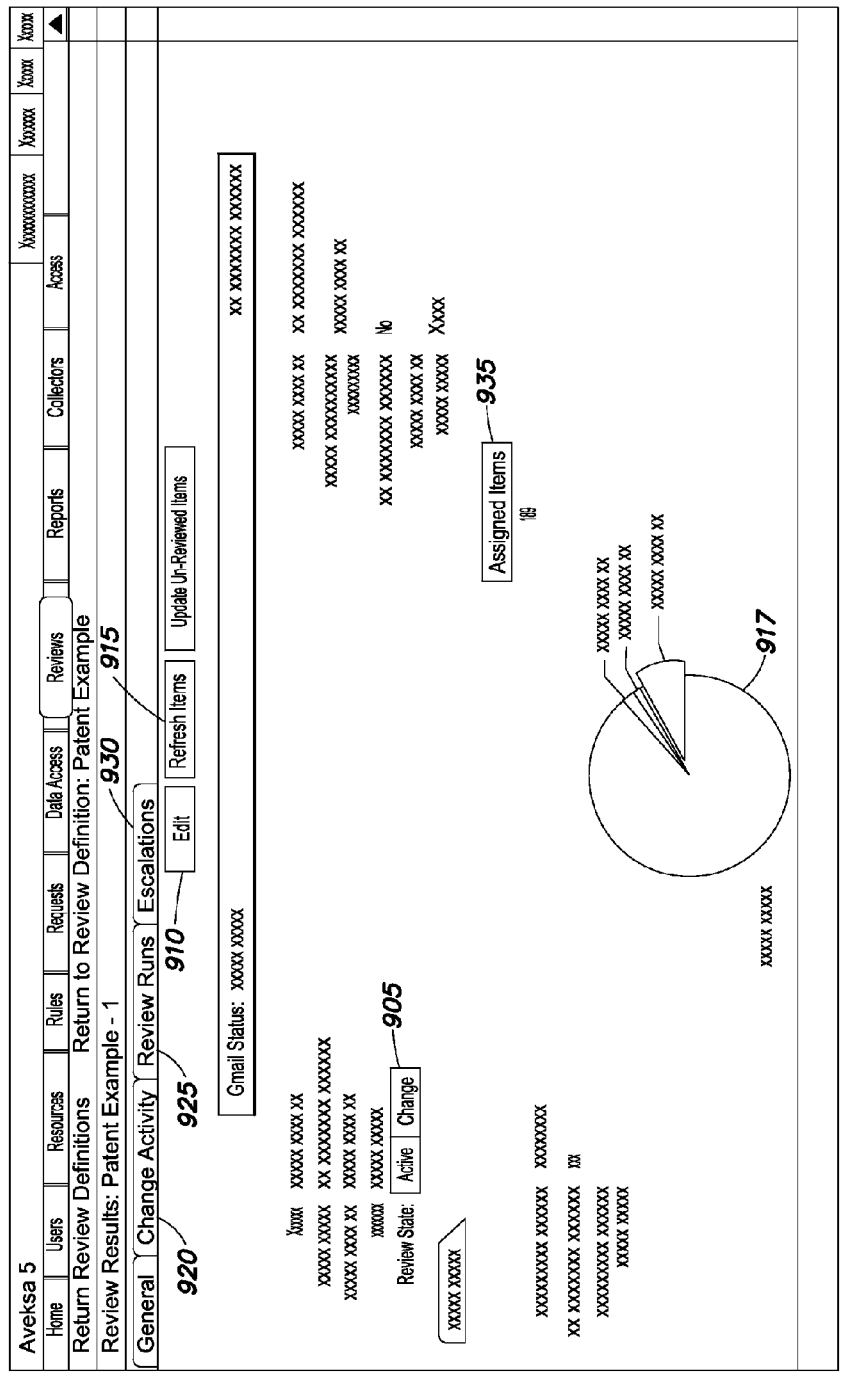
FIG. 9 is a pictorial view of a screenshot of one embodiment of the invention showing an example of a results screen that is used by the review's owner to track the status of the review cycle.

FIG. 9 shows an example screen 900 of a specific instance of a review in process. The user can control the state (Review State field 905), edit the details of this instance using the Edit button 910, refresh and update the contents of the review using the Refresh Items button 915, or drill into details of which reviewers have completed how much of their assigned work. In one embodiment, the screen 900 also includes a pie chart 917 which relays a breakdown about the state of the review items. In the example shown, the screen 900 also displays (1) lists of changes made during this review run when the Change Activity tab 920 is selected, (2) different runs of this review when the Review Runs tab 925 is selected, and (3) a list of escalations associated with this review instance when the Escalations tab 930 is selected. The screen 900 may also display the details from the "Assigned Items" by selecting button 935. The results screen 900 may be used by the review's owner to track the status of the review cycle, determine which reviewers are performing (or failing to perform) their reviews, and eventually to close the review (and possibly to explicit push out changes from the review). The review owner is the person(s) responsible for the review.

Figure 10:
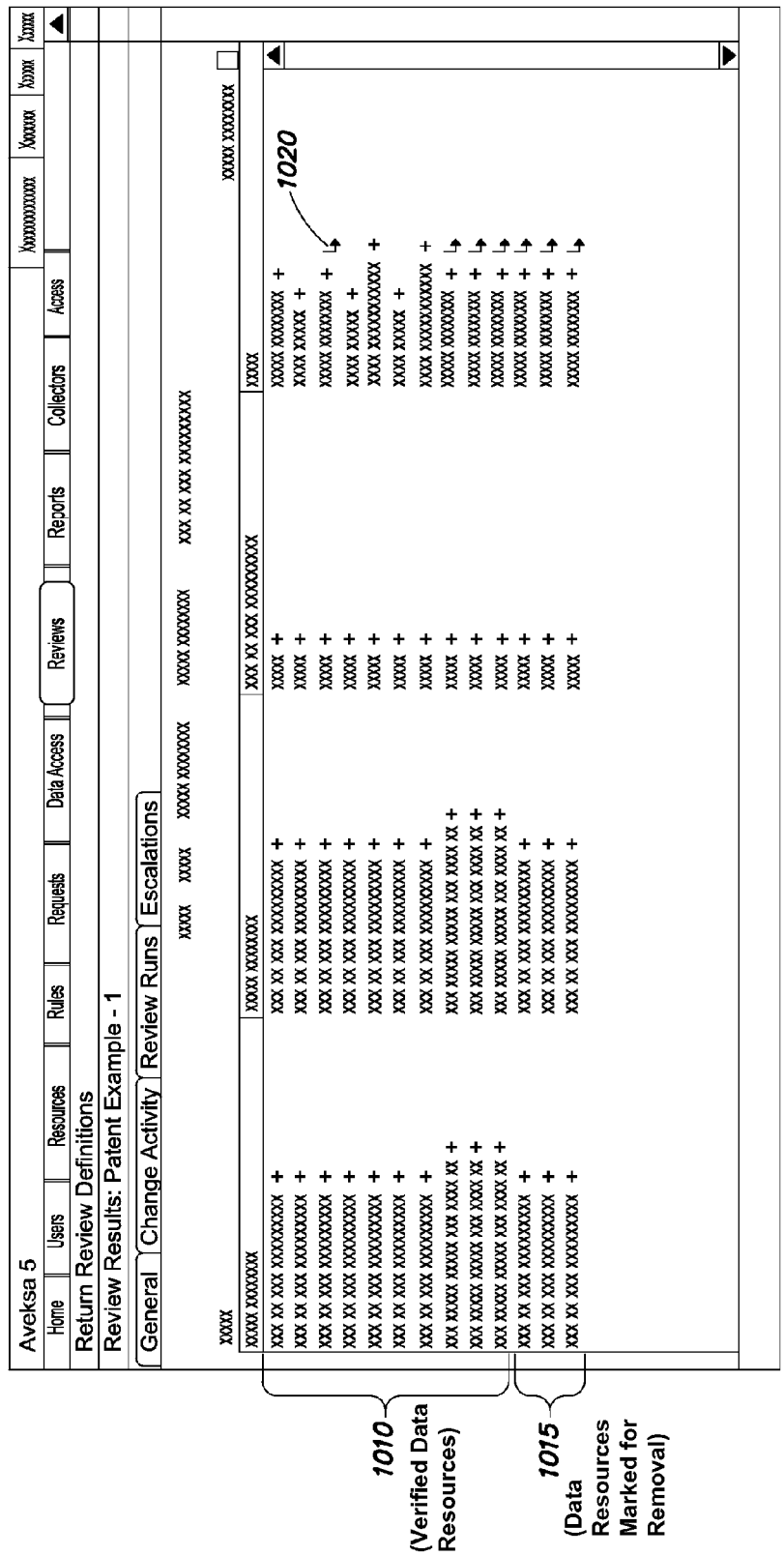
FIG. 10 is a pictorial view of a screenshot of one embodiment of the invention showing an example screen displayed to a reviewer showing the changes made to a specific instance of a review in process.

FIG. 10 shows an example screen 1000 of a specific instance of a review in process when the Change Activity tab 920 is selected. The review owner can determine which data resources have been marked verified and which have been identified for removal. In the example shown in FIG. 10, the ownership of data resources 1010 has been verified and data resources 1015 have been marked for removal. The arrow icon 1020 is used to denote a change to a value on the data resource. This enables users to see an audit trail of the original value and the new value within the review.

While the creation and maintenance of review definitions is a fairly rare operation, that typically involves a very small number of highly knowledgeable users of the access management system 105, the actual use of these definitions to drive a review cycle involves a much larger set of users (everyone who operates as a reviewer or monitor, or anyone delegated to by those people).

When a review cycle is started (either by the system on a schedule, or by an administrator explicitly), these persons to be involved in the review will be made aware of the review by the review module 115. In one embodiment, the access management system 105 maintains a task list for each potential review participant. In one such embodiment, the review participants are made aware of their participation in a pending review when the review appears as a work item on their task list. In other embodiments, the system may send an email to the reviewers and/or monitors notifying them of the review. In one embodiment, a reviewer may select a "perform" option to take the reviewer to a screen listing the data resources they have been assigned to review.

Figure 11:
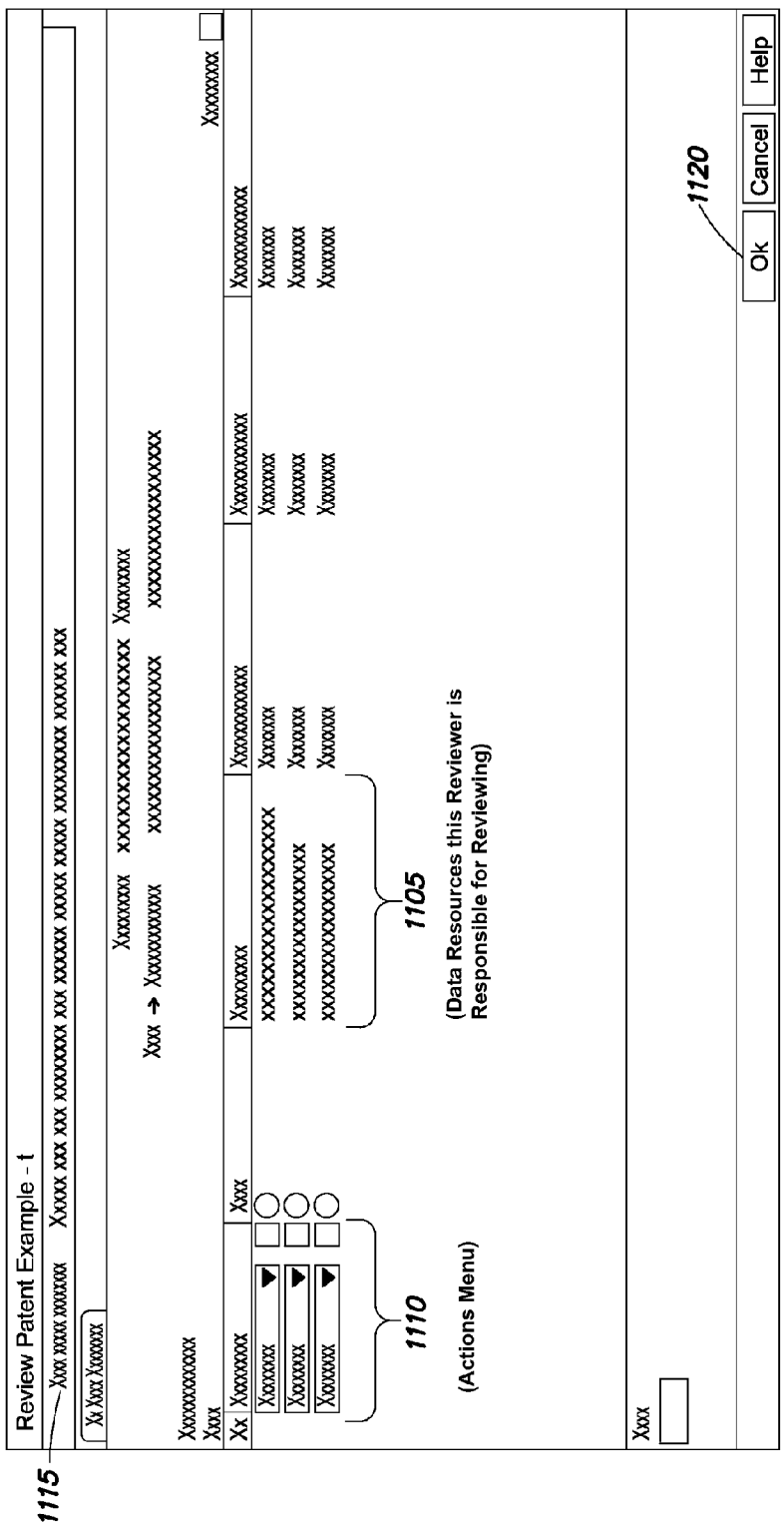
FIG. 11 is a pictorial view of a screenshot of one embodiment of the invention of an example screen displayed to a reviewer once the reviewer opts to perform a review.

FIG. 11 is an example screen 1110 displayed to a reviewer once the reviewer opts to perform a review. This screen 1100 shows the list of data resources 1105 that this reviewer is responsible for reviewing, along with an actions menu 1110 for each one. Selecting the an actions button 1110 displays a drop down menu showing the review actions the administrator user enabled when defining the data resource review definition. If the review action text was customized, the customized text would be identified here. The actions 1110 are used to place the data resources in the most current accurate state (i.e. verified, to be removed, not managed, etc.) and to identify the owner of the verified resources. In one embodiment, the table shown in the screen 1100 has standard table capabilities such as click to sort columns, drag to rearrange columns, search/grouping, paging, column selection and option buttons, etc. and also has the standard additional buttons at the bottom for review lists. In another embodiment, the screen 1100 also has a collapsible ribbon 1115 at the top showing the reviewer instructions that were entered into the review definition.

In general, the reviewer will stay on this screen 1100 until the reviewer has performed an action for each data resource 1105 being reviewed. Once the reviewer has reviewed each data resource, the reviewer may select the "OK" button 1120, thereby completing their work. In one embodiment, if the reviewer needs to stop the reviews before completion, the data resource review module 115 will remember which data resources have already been resolved and how the data resources were resolved, so that the reviewer can resume the reviews at a later time.

Figure 12:
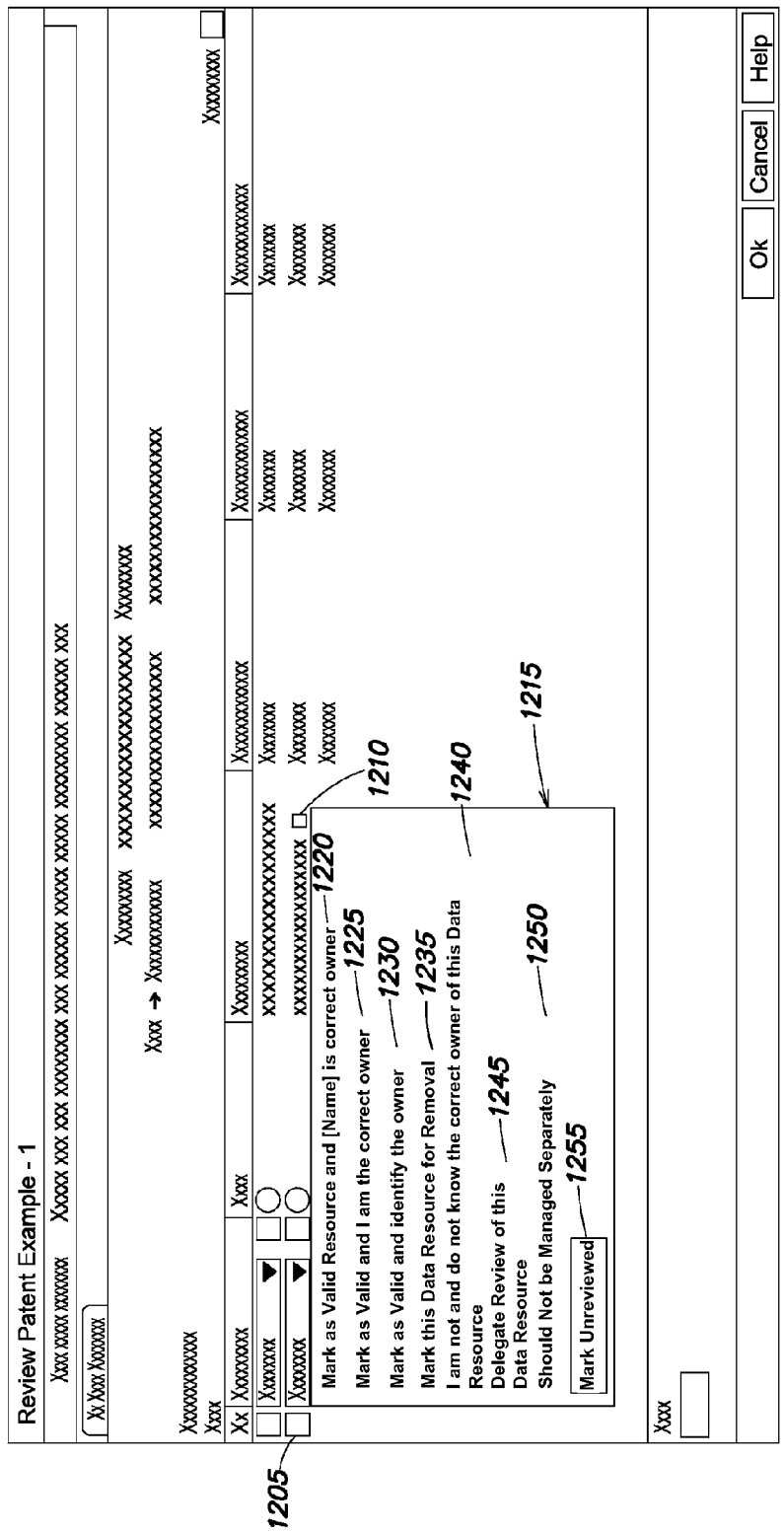
FIG. 12 is a pictorial view of a screenshot of one embodiment of the invention showing the actions available to a reviewer for a data resource.

As described above, selecting the an actions button 1110 displays a drop down menu showing the review actions the administrator user enabled when defining the data resource review definition. FIG. 12 is an example screen 1200 displayed to a reviewer once the reviewer selects an actions menu 1205 for a data resource 1210. The screen 1200 shows a sample drop down menu 1215 that appears when the actions menu 1205 is selected. The first option 1220 is "Mark as a valid data resource and [identified name] is the correct owner". Selecting this option 1220 indicates that the data resource is valid and the owner already identified is accurate. The second option 1225 is "Mark as a valid data resource and I am the correct owner". Selecting this option 1225 marks the data resource as valid, and changes the data resource's owner to the reviewer. A third option 1230 is "Mark as a valid data resource and identify the owner". When this option 1230 is selected, the reviewer is indicated that the data resource is valid, but that the identified data resource owner is not correct. In one embodiment, the reviewer can then select the owner. If the data resource has a list of suggested owners, the reviewer can select the correct owner from the list. In another embodiment, the owner can be selected from a list of all known users.

A fourth option 1235 is "Mark this data resource for removal". Selecting this option 1235 will change the data resource's state to "to be removed". A data resource administrator can then instruct the system to remove the data source at a future time. In one embodiment, the data resources marked as "to be removed" will remain in the system until a future inventory is done in which the data resource is no longer present.

A fifth option 1240 is "I am not and do not know the correct owner of this data resource". If a reviewer selects this option 1240, the reviewer is removing the review of this data resource from their list and placing it in an unassigned pool for the review owner/monitor to address. This selection also ensures that the reviewer is no longer a suggested owner for the given data resource.

A sixth option 1245 is "Delegate review of this data resource." Selecting this option 1245 removes the data resource from the reviewer's list of items to review. In one embodiment, this option 1245 enables the reviewer to select a different reviewer. If the reviewer is a review owner or monitor, this option 1245 allows the reviewer to move the data resource being reviewed to a different reviewer or to add reviewers. If the reviewer selects the second option, the current reviewer will continue to have the data resource in their list of review items.

A seventh option 1250 is "This data resource should not be managed separately." Selecting this action does not change the state of the data resource. It identifies the resource to be checked by an administrator who can make a change at a later time.

Finally, the reviewer may select the "Mark as unreviewed" option 1255. This option 1255 reverts any changes that the reviewer made as part of the review for this item. In one embodiment, this option 1255 is only available when the reviewer has made changes and those changes have not been committed. Once committed, the changes cannot be reverted by this action.

As described above, in one embodiment, reviewers can leave an "in process" review at any time. Their incomplete work will remain on their task list until their review is complete. Reviews that are complete will also remain on a reviewer's list marked as "complete" or identified at "100%" until the review is closed.

Figure 13:
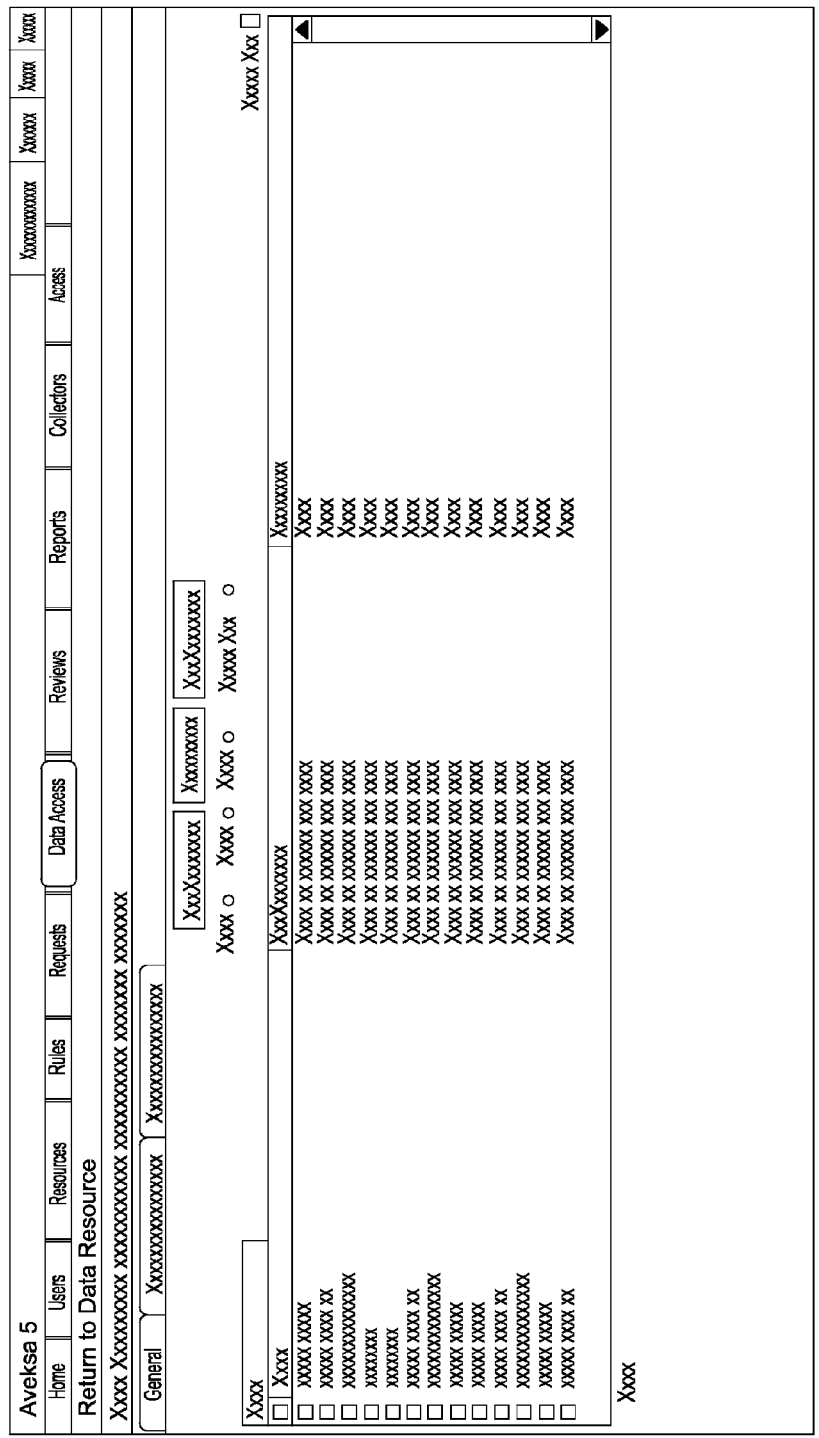
FIG. 13 is a pictorial view of a screenshot of one embodiment of the invention showing who has opted out of the suggested owners list for a data resource.

As described above, at times the system utilizes a suggested owners list during a review. The suggested owners list can be used when the user decides who should review the data resources. As discussed earlier, this list can be used to assign item(s) to all suggested owners or the top "N" owners. This is configured as part of the review definition. A second place where data resource ownership reviews interact with the suggested owners list is when a reviewer indicates they are not the owner. This is done using either the 'I am not and do not know the correct owner' action or the 'Delegate review of this data resource' action. When either of these actions is selected, the suggested owners list associated with the selected data resource(s) is updated and the reviewer is flagged as opted out. This does not remove the user from the suggested owners list but flags the entry so a data resource administrator can see that the particular reviewer has opted out. In future data resource ownership reviews, opted out reviewers are excluded when the suggested owners list is used to assign reviewers. FIG. 13 shows an exemplary screenshot 1300 of one embodiment of an interface where an administrator can view the suggested owners list for a data resource and observe who has opted out:

In one embodiment, all the changes made to a data resource during the review are kept as "proposed" changes to the current data resource until the review is complete or the changes are explicitly committed outside of the review. If a reviewer looks into details of a data resource under review more than once, or if other reviewers have made changes as part of this review, the reviewer will see those changes.

The techniques described above can be implemented in digital electronic circuitry, or in computer hardware, firmware, software executing on a computer, or in combinations of them. The techniques can be implemented as a computer program product, i.e., a computer program tangibly embodied in tangible, machine-readable storage medium, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions described herein by operating on input data and generating output. Method steps can also be performed by, and apparatus of the invention can be implemented as, special purpose logic circuitry, e.g., an FPGA (field programmable gate array) or an ASIC (application-specific integrated circuit). Applications can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Storage media suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A computing system implementing the invention can include clients and servers. A client and server are generally remote from each other and typically interact over a communication network. The relationship of client and server arises by virtue of computer programs running on the respective computers and having a client-server relationship to each other.

Having described various embodiments of the invention, it will now become apparent to one of skill in the art that other embodiments incorporating the concepts may be used. It is felt, therefore, that these embodiments should not be limited to the disclosed embodiments, but rather should be limited only by the spirit and scope of the following claims.

What is claimed is:

1. A method for reviewing data resource ownership, comprising the steps of:

storing a plurality of data resource identifiers in a first database, each of the plurality of data resource identifiers identifying one of a plurality of data resources and having an associated owner field, the owner field for indicating a person responsible for the respective data resource;

storing a review definition in a second database, the review definition defining a review process for at least one of the plurality of data resources for reviewing whether the owner field of each at least one of the plurality of data resources stores correct information in the first database; and executing by a processor the review process defined by the review definition, wherein executing the review process includes, in response to the owner field for one of the plurality of resource identifiers failing to identify an owner of the respective data resource, (i) displaying a list of suggested owners of the data resource to a user, (ii) accepting a selection from the user of the owner of the data resource from the list of suggested owners, and (iii) assigning the owner field for said one of the plurality of resource identifiers to identify the owner that the user has selected from the list of suggested owners.

2. The method of claim 1 further comprising the step of storing a plurality of review definitions in the second database, each of the plurality of review definitions defining a review process for one of the plurality of data resources.

3. The method of claim 1 wherein the review definition defines the review process to include a first subset of the plurality of data resources.

4. The method of claim 1 further comprising the step of the processor creating the review definition.

5. The method of claim 4, wherein the step of creating the review definition comprises the processor receiving a selection from predetermined review options.

6. The method of claim 4, wherein the step of creating the review definition comprises the processor receiving a selection of at least one of the plurality of data resources for the review.

7. The method of claim 6, wherein the selection may be selected from the group consisting of: data resource name, data resource state, data resource type, data resource set, data resource attribute, and data resource set attribute and data resource owner.

8. The method of claim 4, wherein the step of creating the review definition further comprises the processor receiving a schedule for the review.

9. The method of claim 4, wherein the step of creating the review definition further comprises the processor receiving a selection of at least one reviewer to perform the review.

10. The method of claim 9, wherein the step of creating the review definition further comprises the processor receiving a plurality of reviewers among which to distribute the review.

11. The method of claim 9 wherein the at least one reviewer is an associated data resource owner.

12. The method of claim 9 wherein step of creating the review definition further comprises the processor receiving a selection of suggested owners to perform the review.

13. The method of claim 12 wherein the processor selects a subset of the suggested owners to perform the review.

14. The method of claim 9, further comprising the step of the processor receiving an owner for the associated owner field from at least one of the reviewers.

15. The method of claim 9 further comprising the steps of:
the processor receiving an "owner unknown" response for the associated owner field from at least one of the reviewers; and
the processor removing the at least one of the reviewers from a list of potential owners.

16. The method of claim 15 further comprising the step of the processor receiving an additional reviewer from the at least one of the reviewers.

17. The method of claim 1, wherein the step of executing the review process further comprises creating a first instance of the review process.

18. The method of claim 1, further comprising the step of executing the review a plurality of times, wherein an instance of the review process is created by the processor for each execution.

19. The method of claim 1, wherein the step of executing the review process further comprises notifying selected reviewers of the review.

20. The method of claim 1, further comprising the step of receiving, by the processor, an instruction to from a user regarding ownership of the at least one of the plurality of data resources.

21. The method of claim 20, wherein the instruction is to modify ownership of the at least one of the plurality of data resources.

22. The method of claim 20, wherein user identifies that the at least one of the plurality of data resources is a valid data resource and the instruction is to maintain the at least one of the plurality of data resources.

23. The method of claim 20, wherein user identifies that the at least one of the plurality of data resources is an invalid data resource and the instruction is to revoke the at least one of the plurality of data resources.

24. The method of claim 1, wherein the review definitions provide processes for reviewing accuracy of information stored in the owner field of each of the plurality of data resource identifiers.

25. The method of claim 24, further comprising:
displaying a screen to a user, the screen presenting options to allow a user to select a particular review type from among multiple review types, the multiple review types including a user access review type and a data resource ownership review type;
accepting a selection from the user of the data resource ownership review type; and
in response to accepting the selection, displaying at least one additional screen to the user for defining aspects of the data resource ownership review type.

26. A system for reviewing data resource ownership, comprising:
a first database storing a plurality of data resources, each of the plurality of data resources having an associated owner, the owner indicating a person responsible for the respective data resource;
a second database storing a review definition, the review definition defining a review process for at least one of the plurality of data resources, the review process constructed and arranged to determine whether the owner of each data resource identifier of each at least one of the plurality of data resources stores correct information in the first database; and
a processor in communication with the first and second databases, the processor constructed and arranged to execute the review process defined by the review definition,
wherein the processor is further constructed and arranged, in response to the owner field for one of the plurality of resource identifiers failing to identify an owner of the respective data resource, to (i) display a list of suggested owners of the data resource to a user, (ii) accept a selection from the user of the owner of the data resource from the list of suggested owners, and (iii) assign the owner field for said one of the plurality of resource identifiers to identify the owner that the user has selected from the list of suggested owners.

27. The system of claim 26 wherein the second database stores a plurality of review definitions, each of the plurality of review definitions defining a review process for a corresponding one of the plurality of data resources.

28. The system of claim 26 wherein the processor creates the review definition by receiving information from a user.

29. The system of claim 28, wherein the processor utilizes user selections from predetermined review options to create the review definition.

30. The system of claim 28, wherein the processor utilizes a user selection of at least one of the plurality of data resources for the review to create the review definition.

31. The system of claim 30, wherein the user selection may be selected from the group consisting of: data resource name, data resource state, data resource type, data resource set, data resource attribute, and data resource set attribute and data resource owner.

32. The system of claim 28, wherein the processor utilizes a user selection of a schedule for the review to create the review definition.

33. The system of claim 28, wherein the processor utilizes a user selection of at least one reviewer to perform the review create the review definition.

34. The system of claim 33, wherein the processor utilizes a user selection of a plurality of reviewers among which to distribute the review to create the review definition.

35. The system of claim 33 wherein the at least one reviewer is an associated data resource owner.

36. The system of claim 33 wherein the associated owner field is to be assigned.

37. The system of claim 36 wherein step of creating the review definition further comprises the processor receiving a selection of suggested owners to perform the review.

38. The system of claim 36, further comprising the step of the processor receiving an owner for the associated owner field from at least one of the reviewers.

39. The system of claim 36 further comprising the steps of: the processor receiving an unknown response for the associated owner field from at least one of the reviewers; and the processor removing the at least one of the reviewers from a list of potential owners.

40. The system of claim 39 further comprising the step of the processor receiving an additional reviewer from the at least one of the reviewers.

41. The system of claim 33 wherein the step of creating the review definition further comprises the processor receiving a selection of at least one user type to determine reviewers to perform the review.

42. A computer program product including at least one non-transitory, computer-readable medium including instructions which, when executed by a processor, cause the processor to perform a method of reviewing data resource ownership, the method comprising:
   storing a plurality of data resource identifiers in a first database, each of the plurality of data resource identifiers identifying one of a plurality of data resources and having an associated owner field, the owner field for indicating a person responsible for the respective data resource;
   storing a review definition in a second database, the review definition defining a review process for at least one of the plurality of data resources for reviewing whether the owner field of each at least one of the plurality of data resources stores correct information in the first database; and
   executing by a processor the review process defined by the review definition,
   wherein executing the review process includes, in response to the owner field for one of the plurality of resource identifiers failing to identify an owner of the respective data resource, (i) displaying a list of suggested owners of the data resource to a user, (ii) accepting a selection from the user of the owner of the data resource from the list of suggested owners and (iii) assigning the owner field for said one of the plurality of resource identifiers to identify the owner that the user has selected from the list of suggested owners.

43. The computer program product of claim 42, wherein the processor is caused to create a first instance of the review process while executing the review process.

44. The computer program product of claim 42, wherein the processor is caused to create an instance of the review process each time the processor executes the review process.

45. The computer program product of claim 42, wherein the processor is caused to notify selected reviewers of the review.

46. The computer program product of claim 42, wherein the processor is caused to modify ownership of the at least one of the plurality of data resources in response to receiving a user instruction to modify the at least one of the plurality of data resources.

47. The computer program product of claim 42, wherein the processor is caused to maintain the at least one of the plurality of data resources in response to receiving a user instruction that the at least one of the plurality of data resources is a valid data resource.

48. The computer program product of claim 42, wherein the processor is caused to revoke the at least one of the plurality of data resources in response to receiving a user instruction that the at least one of the plurality of data resources is an invalid data resource.

* * * * *